(12) United States Patent
Smochek

(10) Patent No.: US 6,502,322 B2
(45) Date of Patent: Jan. 7, 2003

(54) ADJUSTABLE POST LEVEL BRACKETS

(76) Inventor: Stanley J. Smochek, Rd. #2 Box 272, Punxsutawney, PA (US) 15767

(*) Notice: Subject to any disclaimer, the term of this patent is extended or adjusted under 35 U.S.C. 154(b) by 46 days.

(21) Appl. No.: 09/798,910

(22) Filed: Mar. 6, 2001

(65) Prior Publication Data

US 2001/0034945 A1 Nov. 1, 2001

Related U.S. Application Data

(60) Provisional application No. 60/205,537, filed on May 22, 2000.

(51) Int. Cl.[7] ................................................ G01C 9/00
(52) U.S. Cl. ........................................................ 33/373
(58) Field of Search .......................... 33/376, 451, 409, 33/1 LE, 413, 379, 347, 365, 371–375, 384, 549, 370

(56) References Cited

U.S. PATENT DOCUMENTS

| | | | | | |
|---|---|---|---|---|---|
| 9,867 A | * | 7/1853 | Sherman | ........................ | 33/376 |
| 517,935 A | * | 4/1894 | Schnell | ........................ | 33/375 |
| 527,815 A | * | 10/1894 | Schnell | ........................ | 33/375 |
| 1,229,916 A | * | 6/1917 | Duncan | ........................ | 33/370 |
| 2,624,953 A | * | 1/1953 | Newcomb | ................... | 33/372 |
| 3,820,249 A | | 6/1974 | Stone | | |
| 3,832,782 A | | 9/1974 | Johnson et al. | | |
| 4,168,578 A | * | 9/1979 | VanderWerf | ................. | 33/347 |
| 4,343,093 A | | 8/1982 | Eadens | | |
| 4,663,856 A | | 5/1987 | Hall et al. | | |
| 4,689,889 A | * | 9/1987 | Reeves | ........................ | 33/1 LE |
| 4,829,676 A | * | 5/1989 | Waldron | ....................... | 33/372 |
| 4,970,796 A | * | 11/1990 | Masters et al. | ................ | 33/347 |
| 4,976,040 A | | 12/1990 | Mish et al. | | |
| 5,088,205 A | | 2/1992 | Egbert | | |
| 5,207,004 A | * | 5/1993 | Gruetzmacher | ............... | 33/373 |
| 5,309,645 A | * | 5/1994 | Hoffmeyer | .................... | 33/354 |
| 5,408,752 A | * | 4/1995 | Eadens | ......................... | 33/376 |
| 5,421,094 A | | 6/1995 | McCord et al. | | |
| 5,996,238 A | * | 12/1999 | Yonke | .......................... | 33/371 |
| 6,029,359 A | * | 2/2000 | Szumer | ........................ | 33/373 |
| 6,167,630 B1 | * | 1/2001 | Webb | ........................... | 33/451 |
| 6,173,205 B1 | * | 1/2001 | Scarborough | ................. | 33/371 |
| 6,173,502 B1 | * | 1/2001 | Scarborough | ................. | 33/371 |
| 6,332,277 B1 | * | 12/2001 | Owoc et al. | ................... | 33/373 |
| 6,442,853 B1 | * | 9/2002 | Hale et al. | ..................... | 33/365 |
| 374 A | * | 9/1837 | Sherman | ....................... | 301/82 |

* cited by examiner

Primary Examiner—Diego Gutierrez
Assistant Examiner—Yaritza Guadalupe
(74) Attorney, Agent, or Firm—Richard C. Litman

(57) ABSTRACT

A post level device that is used to align post or pipe materials horizontally, vertically or diagonally. The device utilizes two adjustable brackets that are attached to the ends of a structural support bar. "U"-bolts, wing nuts and a Neoprene insert are used to adjustably hold the two spirit levels which can vary in length. A hook and loop fastener secures the device to the post or pipe materials, thereby freeing up the user's hands to conduct other activities. A second embodiment of the device is also provided which can be used for aligning smaller post pipe materials and requires only a single bracket. Other embodiments employ an attachment block with appropriate slots for a bracket and a peripheral portion of the spirit level, in place of slotted bracket and "U"-joints.

10 Claims, 8 Drawing Sheets

ADJUSTABLE POST LEVEL BRACKETS

CROSS-REFERENCE TO RELATED APPLICATION

This application claims the benefit of U.S. Provisional Patent Application Serial No. 60/205,537, filed May 22, 2000.

BACKGROUND OF THE INVENTION

1. Field of the Invention

The present invention relates to a level bracket that is attached vertically, horizontally or diagonally to a post or pipe to align that post or pipe.

2. Description of Related Art

Setting fence posts is always difficult work, particularly when the posts must be set in a straight upright position. This type of work has previously been done with an ordinary spirit level that is placed along the side of the post being set. This method of setting posts ties up a worker's hands that could be used to be doing something else related to setting the fence post.

The related art describes a number of level devices that can also be used to set fence posts as well as other structural members. U.S. Pat. No. 3,820,249 issued Jun. 28, 1974, to Stone, outlines the use of a self-gripping spirit level that is designed to be used by ironworkers to set and align piping. This particular spirit level utilizes magnets to attach itself to the piping being set, thereby freeing up the user's hands to perform other functions related to setting the piping other than holding the spirit level.

U.S. Pat. No. 3,832,782 issued Sep. 3, 1974, to Johnson et al. outlines the use of a multipurpose spirit level designed to be used by a wide variety of craftsmen. This spirit level sits on a v-shaped base that can be placed on piping as well as other structural members. Like the device outlined in the Stone patent, this spirit level also utilizes magnetic material to secure the spirit level to magnetically attractable work members, thereby also potentially freeing up a user's hands to do other things. A makeshift protractor is also provided on this device to set piping at different angles.

U.S. Pat. No. 4,343,093 issued Aug. 10, 1982, to Eadens outlines the use of a plumb tool that utilizes a body member having a pair of right-angular arms for use in engaging the object that is to be plumbed. A ledge projects from one arm and supports an orbital bubble level and a bead chain is attached at one end to the body member and is adapted to encircle the object that is to be plumbed. This device is also designed to free up the hands of the user for positioning and securing the object while it is being plumbed.

U.S. Pat. No. 4,976,040 issued Dec. 11, 1990 to Mish et al. outlines a device that is specifically designed to align and set posts. A first elastic band is used to form a right angle with a spirit level placed on each end of the elastic band. The first elastic band is then placed around the post and a second elastic band is used to encircle the remainder of the post. The second elastic band is attached to one of the spirit levels secured by a securable hook placed on the end of the second elastic band into a receiving eyelet on the other spirit level. The device can also be secured around the post using nails and nail holes provided on the bands.

U.S. Pat. No. 5,088,205 issued Feb. 18, 1992, to Egbert outlines an apparatus for removably attaching a leveling device to an object. The apparatus is used to attach a carpenter's level to a substantially vertical stud at a construction site while the stud is being fastened into place. The apparatus can free up the hand's of a lone construction worker who needs to keep a stud plumb while fastening the stud into place.

U.S. Pat. No. 5,421,094 issued Jun. 6, 1995, to McCord et al. outlines the use of an adjustable level that utilizes a L-shaped bracket, a one-bubble housing attached to the L-shaped bracket and a spring-loaded flexible cord that wraps around and secures the object being aligned. Magnets are also provided on each side of the bracket to add security to metal objects, such as pipes, that might be aligned with the device.

U.S. Pat. No. 4,663,856 issued May 12, 1987, to Hall et al. outlines the use of a kit used to facilitate the construction of a fence with vertical posts and horizontal rails. Both can be set using the leveling device that is included in the kit, which is designed to be attached to the vertical posts and horizontal rails with hook and loop fasteners being set so as to free the hands of a user and to facilitate the rapid positioning and alignment of these posts and rails.

The device outlined in the Hall et al. patent is the only device found in the related art that utilizes a hook and loop fastener for securing a leveling device to a post or rail that must be aligned. The hook and loop fasteners however, can be better arranged and designed than those used in the device outlined in the Hall patent. That is what is really needed, a better designed leveling device using hook and loop fasteners that can be used to free up the hands of a user while aligning a post or rail.

None of the above inventions and patents, taken either singly or in combination, is seen to describe the instant invention as claimed.

SUMMARY OF THE INVENTION

The invention is a post level device that is used to align post or pipe materials horizontally, vertically or diagonally. The device utilizes two adjustable brackets attached to the ends of a structural support bar. "U"-bolts, wing nuts and a Neoprene® insert are used to adjustably hold the two spirit levels, that can vary in length. A hook and loop fastener secures the device to the post or pipe materials, thereby freeing up the user's hands to conduct other activities. A second embodiment of the device is also provided which can be used for aligning smaller post and pipe materials.

Accordingly, it is a principal object of the invention to provide a device that can align post or pipe materials while a user utilizes his hands to conduct other activities.

It is another object of the invention to provide a hands-free leveling device that can align post or pipe materials that is easily adjustable.

It is a further object of the invention to provide a hands-free leveling device that can align materials vertically, horizontally or diagonally.

Still another object of the invention is to provide a hands-free leveling device that can utilize differing sizes of spirit levels for aligning both large and small post or pipe materials.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
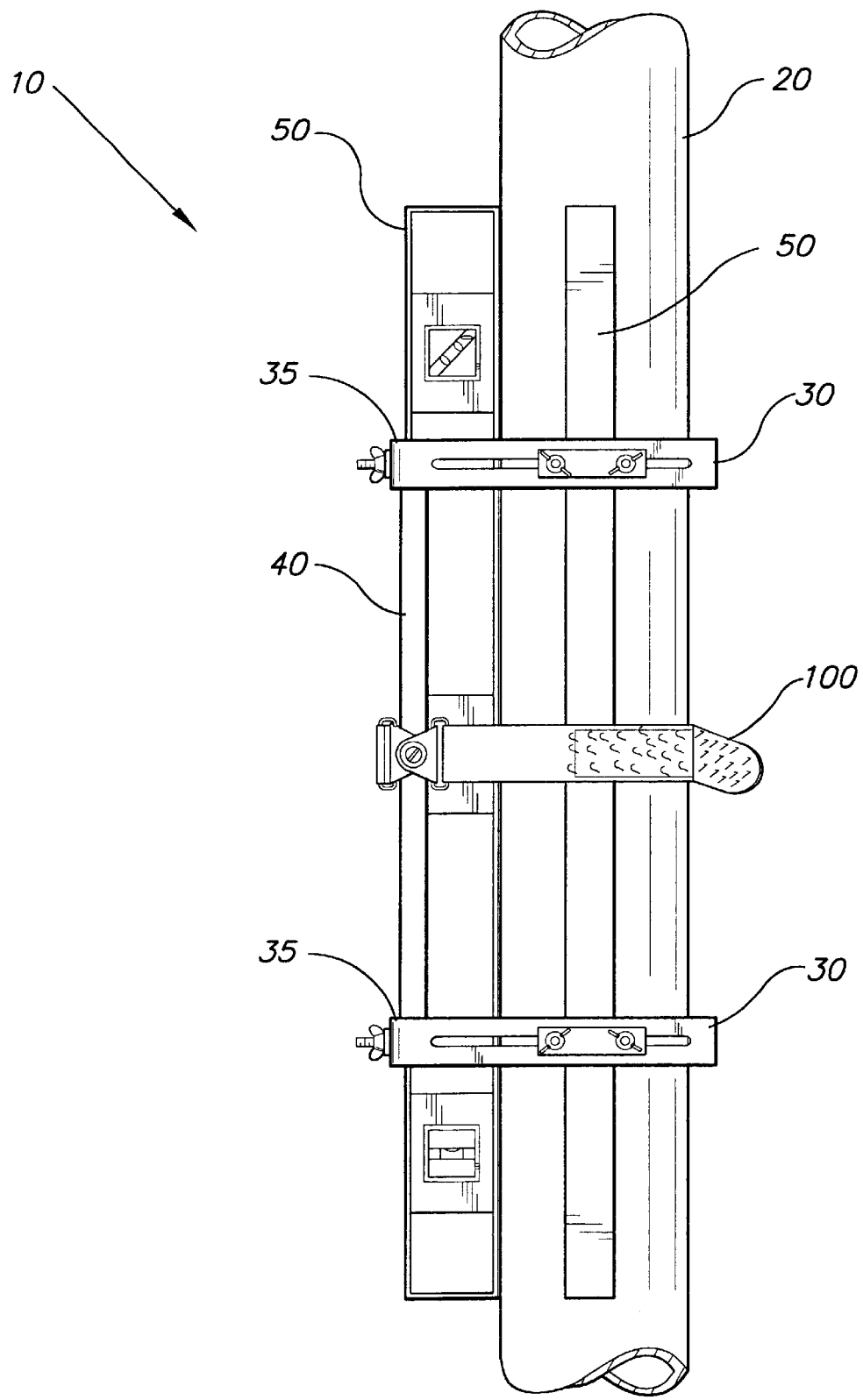
FIG. 1 is an environmental, perspective view of an adjustable post level bracket according to the present invention.

The present invention is a post level bracket apparatus 10 useful to vertically, horizontally and diagonally align a post or a pipe material 20, as depicted in FIG. 1.

The post level bracket apparatus 10 comprises a predetermined number of brackets 30 that are bent at a right angle and features means for holding a predetermined number of spirit level(s) 50 in a fixed position, a structural support rod 40 permanently attached to the vertex 35 of each of the brackets 30 at each end of the structural support rod 40, and an adjustable attaching means 100 for temporarily attaching the apparatus 10 to a post or a pipe material 20.

Figure 2:
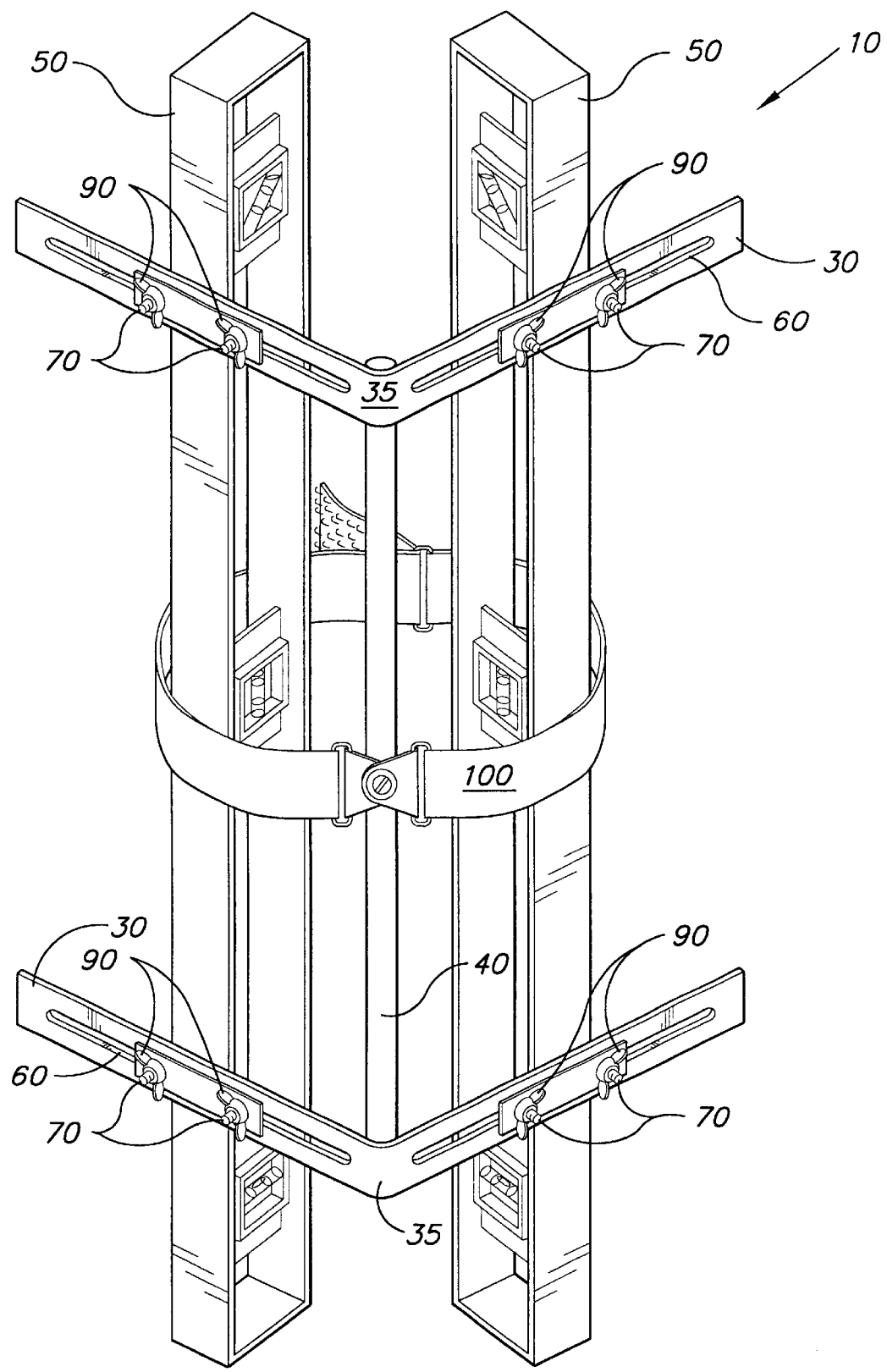
FIG. 2 is a back perspective view of an adjustable post level according to the present invention.

As shown in FIG. 2, the preferred embodiment, there are two brackets 30 and two spirit levels 50 that are 2 feet in length. The apparatus 10 can accommodate longer spirit levels 50 as well for being useful with larger post or pipe material 20 (see FIG. 1). Slots 60 are provided on each arm of the brackets 30 to accommodate a "U"-bolt 70 that is extended through the slot 60 on each side of the bracket 30. A semicircular machined Neoprene® insert (not shown) is placed between the "U"-bolt 70 and the adjacent wall of spirit level 50 which is disposed against the inner wall of bracket 30 resulting in added stability. These components, combined with a pair of wing nuts 90 makes up the holding means for the apparatus 10. A backing plate may be employed between the bracket 30 and the wing nuts 90 to reduce wear along slot 60. Spirit levels 50 can also be moved closer to or nearer the structural support rod 40 by moving the "U"-bolt 70 and Neoprene® insert (not shown) along the slots 60 as desired by the user.

The apparatus 10 also has an adjustable attaching means, which is a strap 100 that encircles the post or pipe material 20 being aligned. A hook and loop fastener, described in U.S. Pat. No. 4,976,040 by Mish et al., described above and hereby incorporated by reference, may be substituted for and is considered equivalent to strap 100. The strap 100 is permanently secured to the center of the structural support rod 40 by a nut and bolt between the vertex 35 of each bracket 30. The brackets 30 are made of thermoplastic material or metallic material and are designed to be durable and long lasting, as is the structural support rod 40, which is preferably made of solid aluminum.

Figure 3:
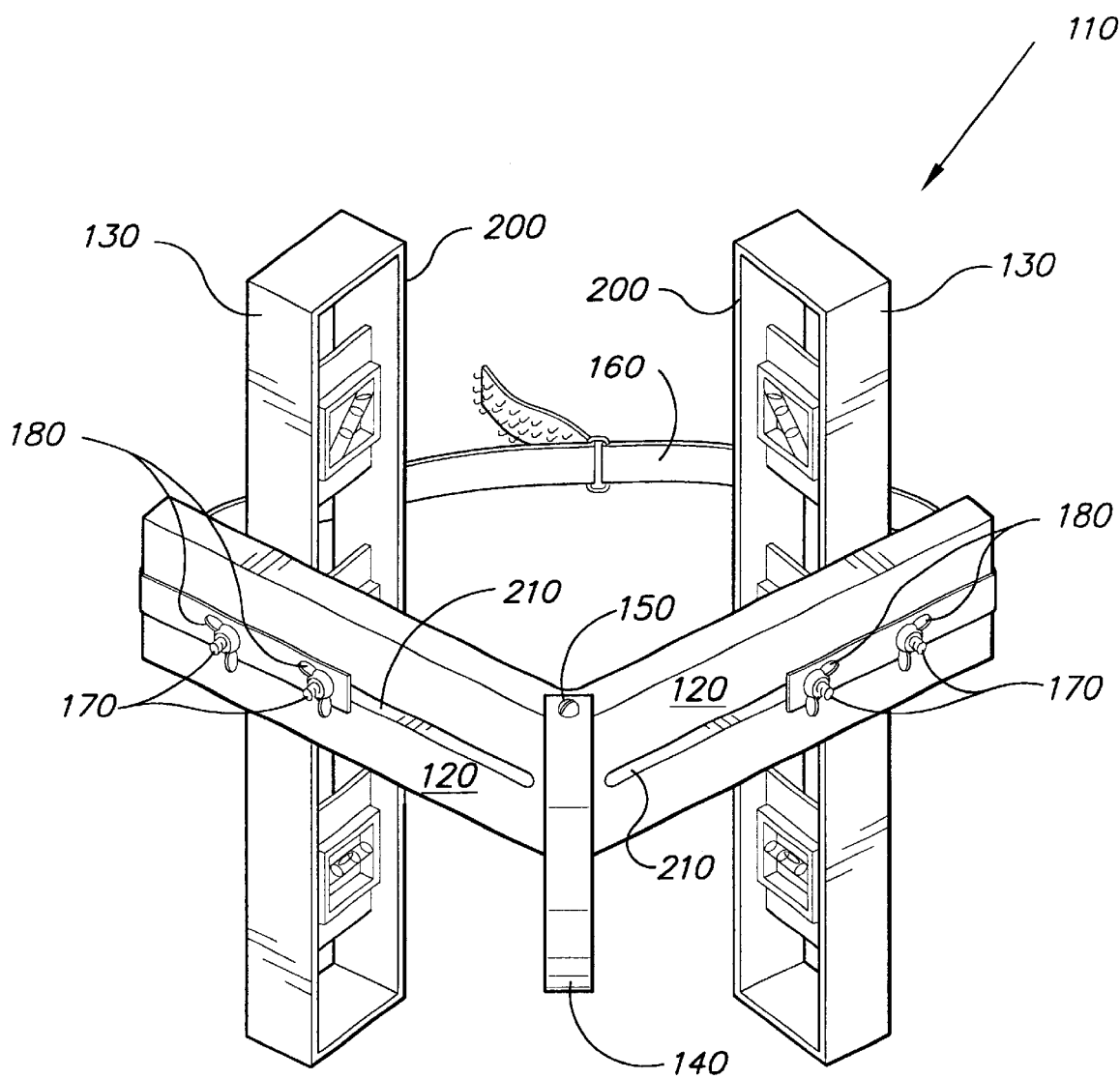
FIG. 3 is a front perspective view of the second embodiment of an adjustable post level bracket according to the present invention.

A second embodiment of the apparatus 110 is illustrated in FIG. 3, which can be used to vertically, horizontally and diagonally align a smaller piece of post and a pipe material 20 (see FIG. 1). The second embodiment 110 comprises a single bracket 120 that is bent at a right angle that has a holding means for holding a predetermined number of spirit levels 130 in a fixed position, a thermoplastic semicircular handle 140 attached to the exterior vertex 150 of the bracket 120, and an adjustable attaching strap 160 for temporarily attaching the apparatus 110 to a smaller post or pipe material 20. Two one-foot long spirit levels 130 are secured by a set of "U"-bolts 170 and wing nuts 180. Attaching strap 160 may be attached at each end to an outer face of bracket 120 by wing nuts 180. These smaller spirit levels 130 can be attached along any part of the slots 210 on the smaller bracket 120. No Neoprene® insert is needed for additional stability, as is the case with the above described first embodiment of the apparatus 10.

The attaching means for the second embodiment 110 of the apparatus 10 is strap 160. The strap 160 is smaller than the strap 100 of the first embodiment of the apparatus 10, since the second embodiment 110 is useful for smaller post or pipe material 20 (see FIG. 1). A strip of magnetic material 200 is provided on a narrow side of each spirit level 130 to help support strap 160.

Like the first embodiment of the apparatus 10, the bracket 120 is made of thermoplastic material or metallic material for strength and durability.

Figure 3A:
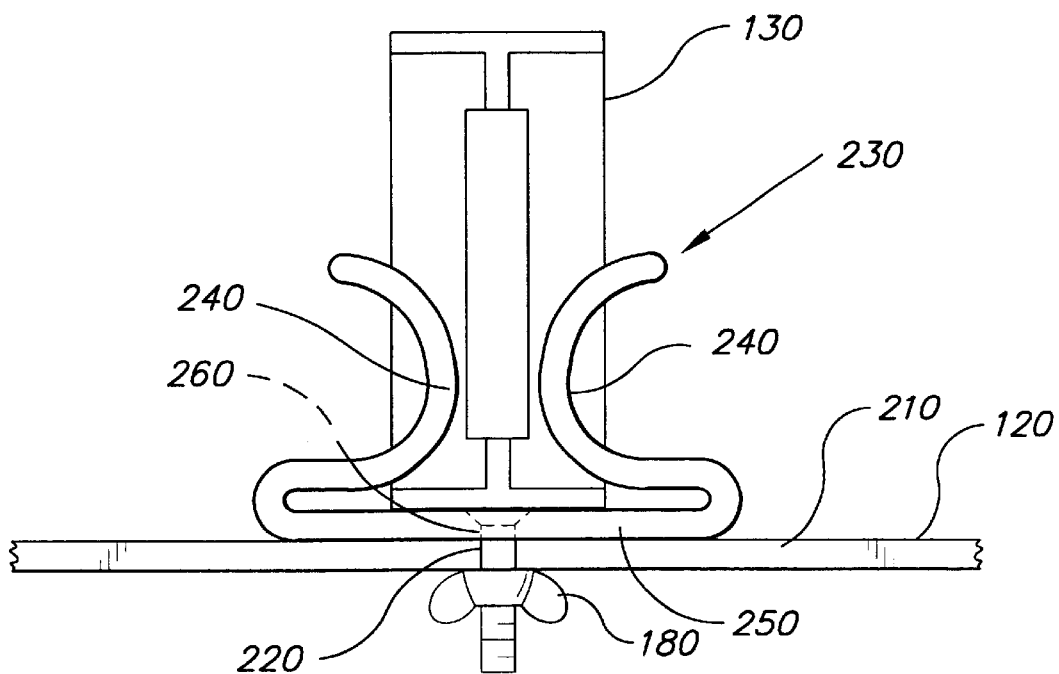
FIG. 3A is a broken away elevation view of the bracket and slot of FIG. 3 with a mounted "C" spring clip for releasably supporting a level.
Figure 3B:
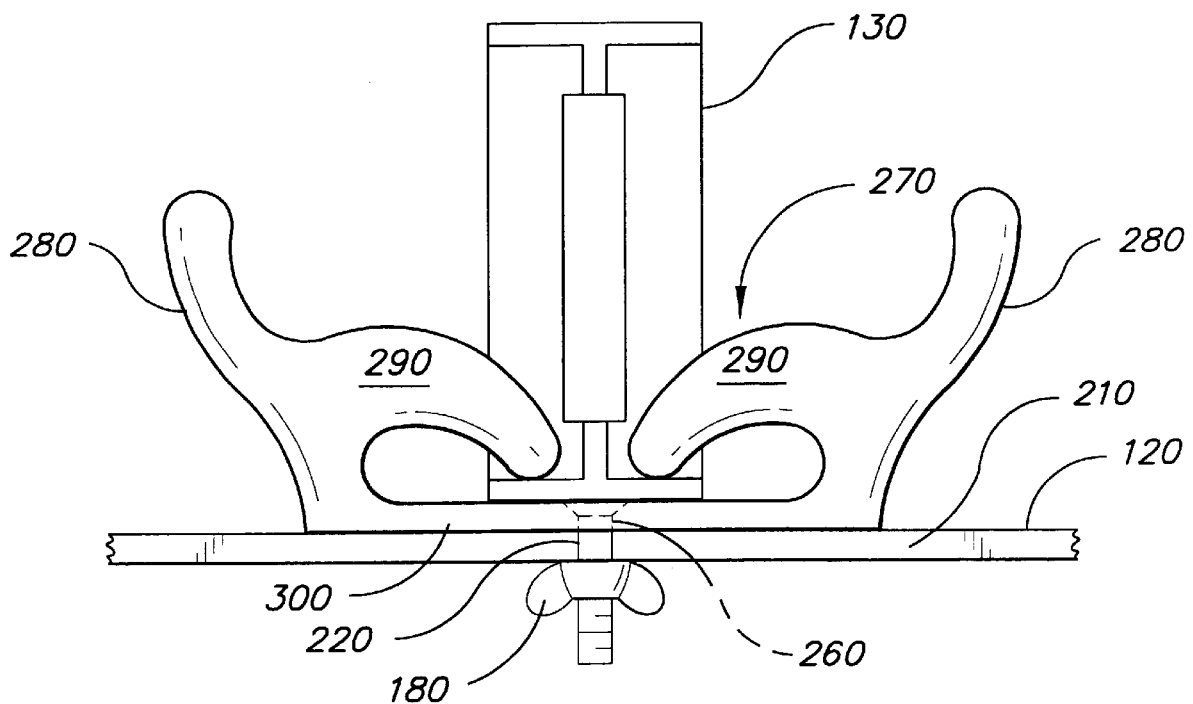
FIG. 3B is a broken away elevation view of the bracket and slot of FIG. 3 with a mounted inverted "C" spring clip for releasably supporting a level.

As seen in FIGS. 3A and 3B, alternatives to "U"-bolts 170 may be provided for supporting spirit levels 130 on bracket 120. As seen in FIG. 3A, "C" spring clip 230, made of spring steel or similar material, and having opposed, outward facing "C" portions 240 connected by a base portion 250 is attached to bracket 120 through groove 210 by attachment bolt 220 located in centrally located attachment bolt bore 260 and secured by wing nut 180. A spirit level 130 may be releasably held by a peripheral wall between "C" portions 240 of spring clip 230.

As seen in FIG. 3B, inverted "C" spring clip 270, features opposed, inward facing "C" portions 290 and are releasable by inverted "C" spring clip release fingers 280 and connected by a base portion 300. Base portion 300 is attached to bracket 120 through groove 210 by attachment bolt 220 located in centrally located attachment bolt bore 260 and secured by wing nut 180. A spirit level 130 may be releasably held by its peripheral wall between inverted "C" portions 290 of spring clip 230. The design of the clip of FIG. 3B is amenable to construction from any appropriate resilient material, such as hard rubber or plastic.

Operation of the first and second embodiments 110,10 are simple. A user aligns a post or pipe material 20 within the interior of the bracket(s) 30,120 and perpendicularly adjacent to the spirit level(s) 50,130. The strap 100,190 is then wrapped around the post or pipe materials 20 being aligned, utilizing the spirit level 50,130 to properly align the post or pipe materials 20, which can be aligned vertically, horizontally or diagonally. The spirit levels employed with the present invention are straight, conventional spirit levels which are commercially available.

A prototype of the first embodiment of the post level bracket apparatus 10 includes 2¼"×2"×14" pieces of aluminum bracket 30 bent into a 90 degree angle in the middle. The slots 60 are ¼" and are cut in both ends for the adjustment and mounting of the spirit levels 50. A ½"×6" structural support rod 40 is welded to the vertex of each bracket 30 with 4 inches of rod 40 extending outward. A 10"

long, ¾" aluminum pipe (not shown) is used to slide over the 4" extended rod to connect both brackets 30 and form a handle. A 1½"×28" strap 100 is also provided, and which is bolted to the handle to wrap around the post 20 and levels 50 to secure the apparatus 10.

A prototype of the second embodiment 110 can also be made from a 5"×5"×2"×⅜" aluminum single bracket 120 with a ¼" slot 210 cut on both ends for adjustment and level mount. A 2" thermoplastic handle 140 is also attached to the second embodiment and a 1"×24" strap 160 is utilized to secure the bracket 120 to any post or pipe material.

Figure 4:
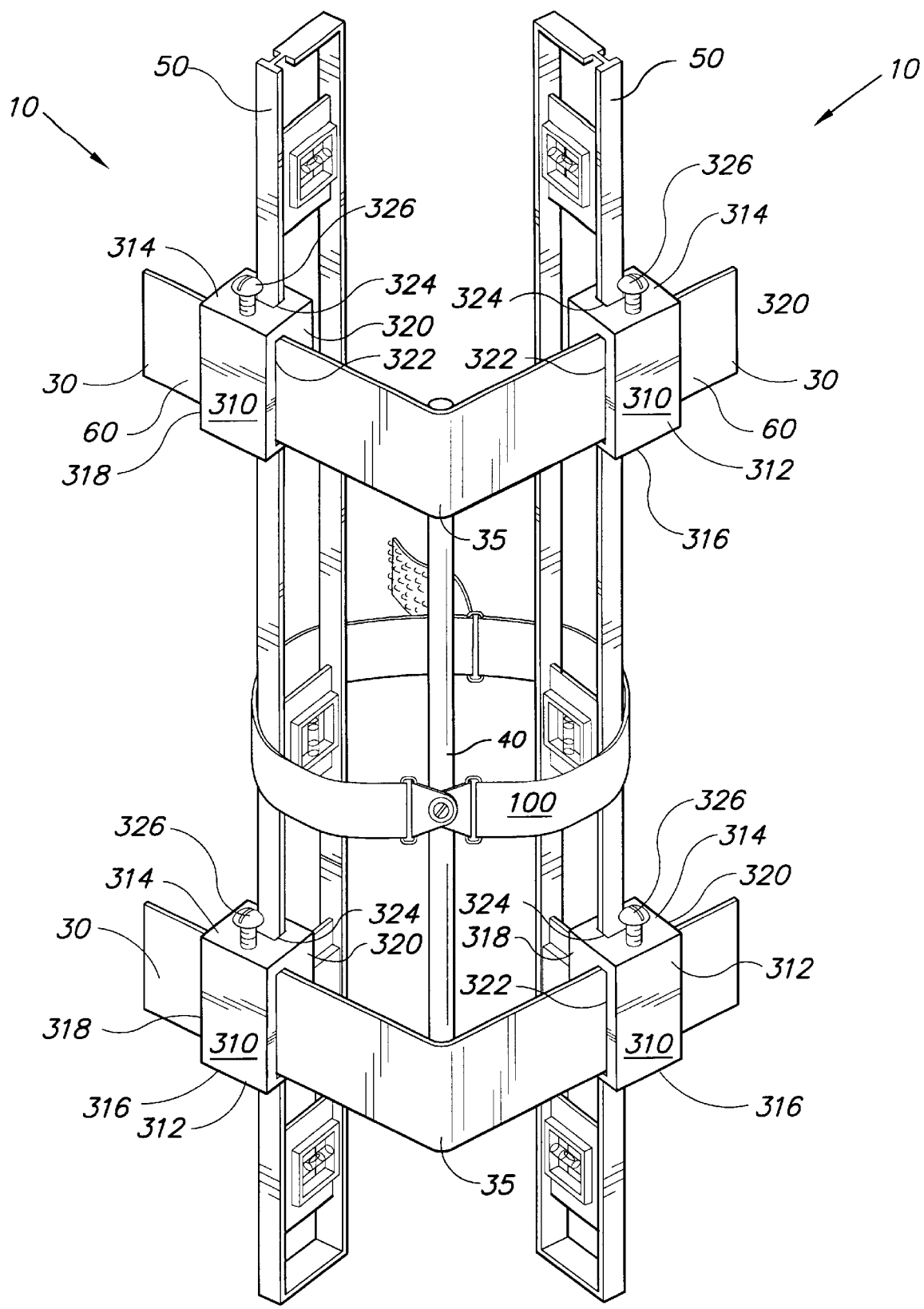
FIG. 4 is a back perspective view of another embodiment of an adjustable post level similar to that of FIG. 2.

Referring to FIG. 4, an alternative to the preferred embodiment of FIG. 2, there are two brackets 30 and two spirit levels 50 that are 2 feet in length. The apparatus 10 can accommodate longer spirit levels 50 as well as for being useful with larger post or pipe material 20 (see FIG. 1). Attachment blocks 310 take the place of "U"-bolts 70 and Neoprene® inserts and slots 60. Attachment blocks 310 contain block bracket grooves 322 sized to fit over each arm of the brackets 30. Each attachment block 310 has an outer wall 312, an inner wall 328, an upper end wall 314, a lower end wall 316, a first side wall 318, and a second side wall 320. Bracket grooves 324 extend through each attachment block 310 from first side wall 318 to second side wall 320 and is parallel to outer wall 312 and inner wall 328. Each attachment block 310 also includes a "T"-shaped spirit level groove 324 so shaped as to fit over a peripheral wall of spirit level 50. A block bracket stop screw 326 is inserted through block upper end 314 so as to bear against the top edge of bracket 30 to allow adjustment of block 310 along bracket 30 by loosening, sliding blocks 310 to the desired location, and then tightening stop screw 326. These elements make up the holding means for the apparatus 10. This embodiment of apparatus 10 has a strap 100 to encircle the post or pipe material 20 as previously described.

Figure 5:
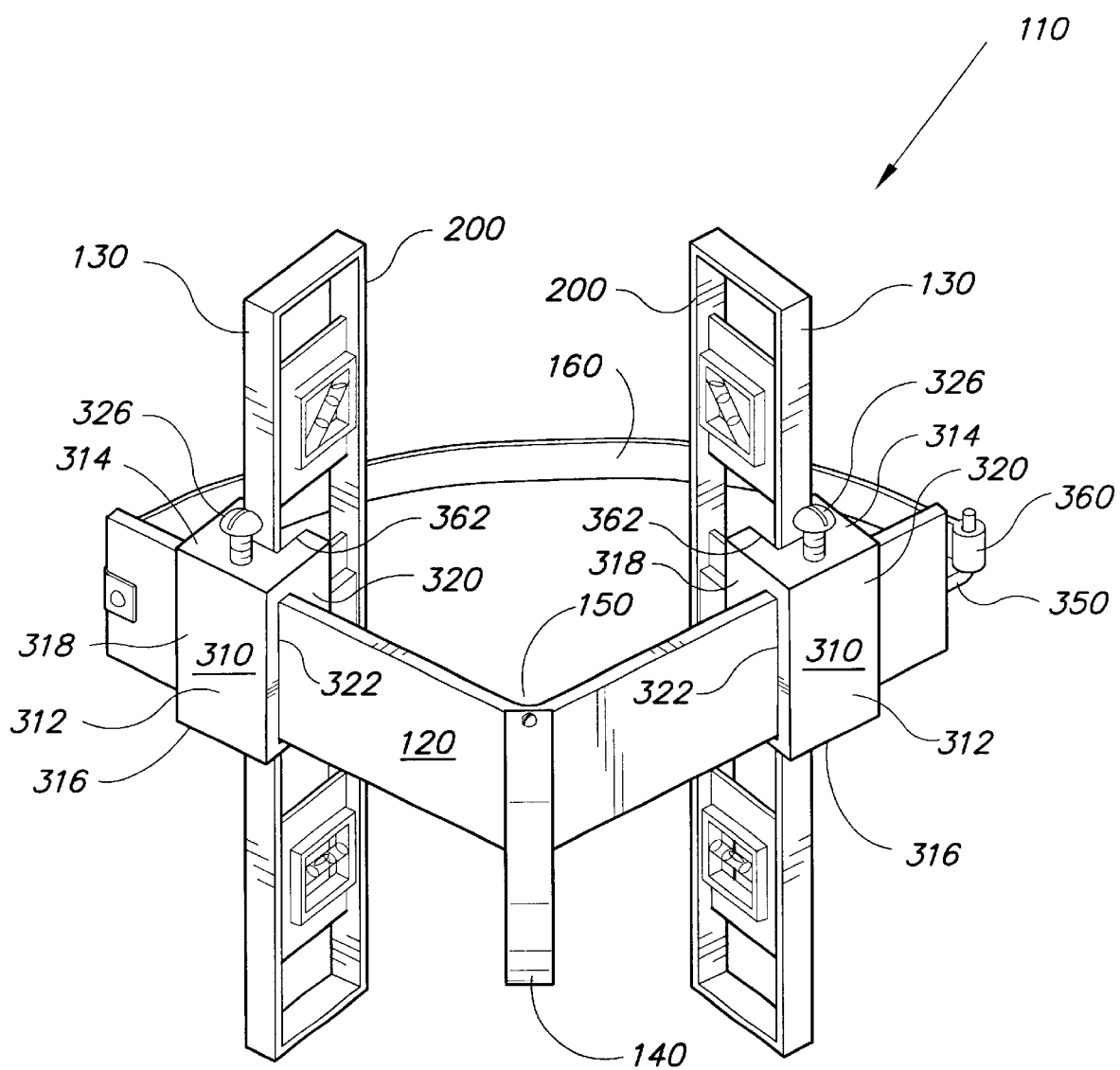
FIG. 5 is a front perspective view of another embodiment of an adjustable post level bracket similar to that of FIG. 3.

Referring to FIG. 5, an embodiment similar to that of FIG. 3 is illustrated which can be used to vertically, horizontally and diagonally align a smaller piece of post and a pipe material 20 (see FIG. 1). The embodiment 110 comprises a single bracket 120 that is bent at a right angle that has a holding means for holding a predetermined number of spirit levels 130 in a fixed position, a thermoplastic semicircular handle 140 attached to the exterior vertex 150 of the bracket 120, and an elastic attaching strap 160 for temporarily attaching the apparatus 110 to a smaller post or pipe material 20. Two one-foot long spirit levels 130 are secured by a pair of attachment blocks 310. Attaching strap 160 may be attached at one end to an outer face of bracket 120 by a rivet or similar means and at the other end to a bracket mounted hook 350 mounted on the remote end of bracket 120 by means of elastic loop 360. These smaller spirit levels 130 can be attached along any part of the smaller bracket 120 by means of attachment blocks 310, similar to those of the embodiment of FIG. 4, above. In this embodiment a slot 362 replaces the "T"-shaped spirit level groove 324 and the apparatus is held together by tension in biased elastic strap 160. A strip of magnetic material 200 is provided on a narrow side of each spirit level 130 to help support strap 160.

Like the first embodiment of the apparatus 10, the bracket 120 is made of thermoplastic material or metallic material for strength and durability.

Figure 6:
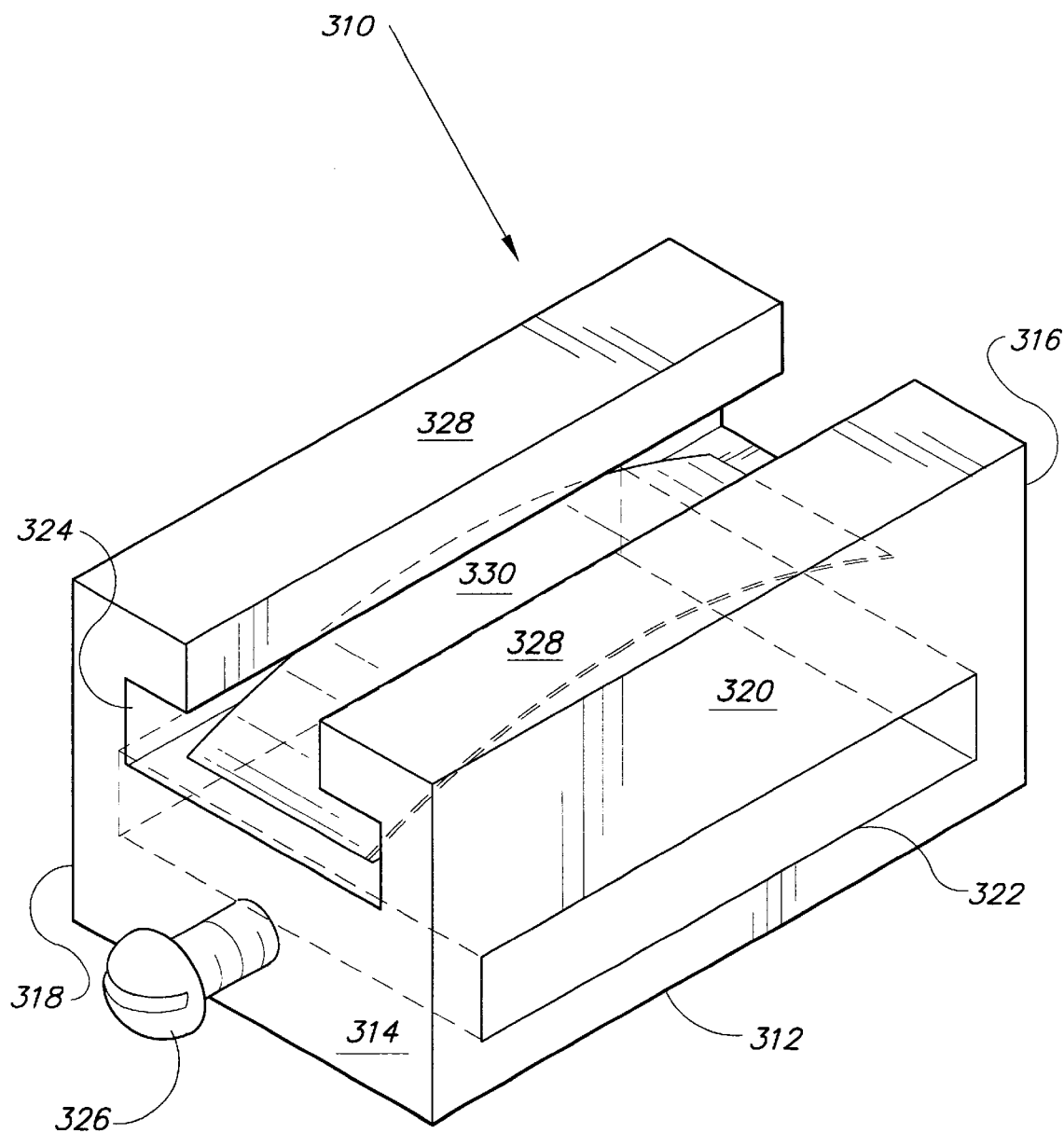
FIG. 6 is a perspective view of an attachment block configured as shown in FIG. 4.
Figure 7:
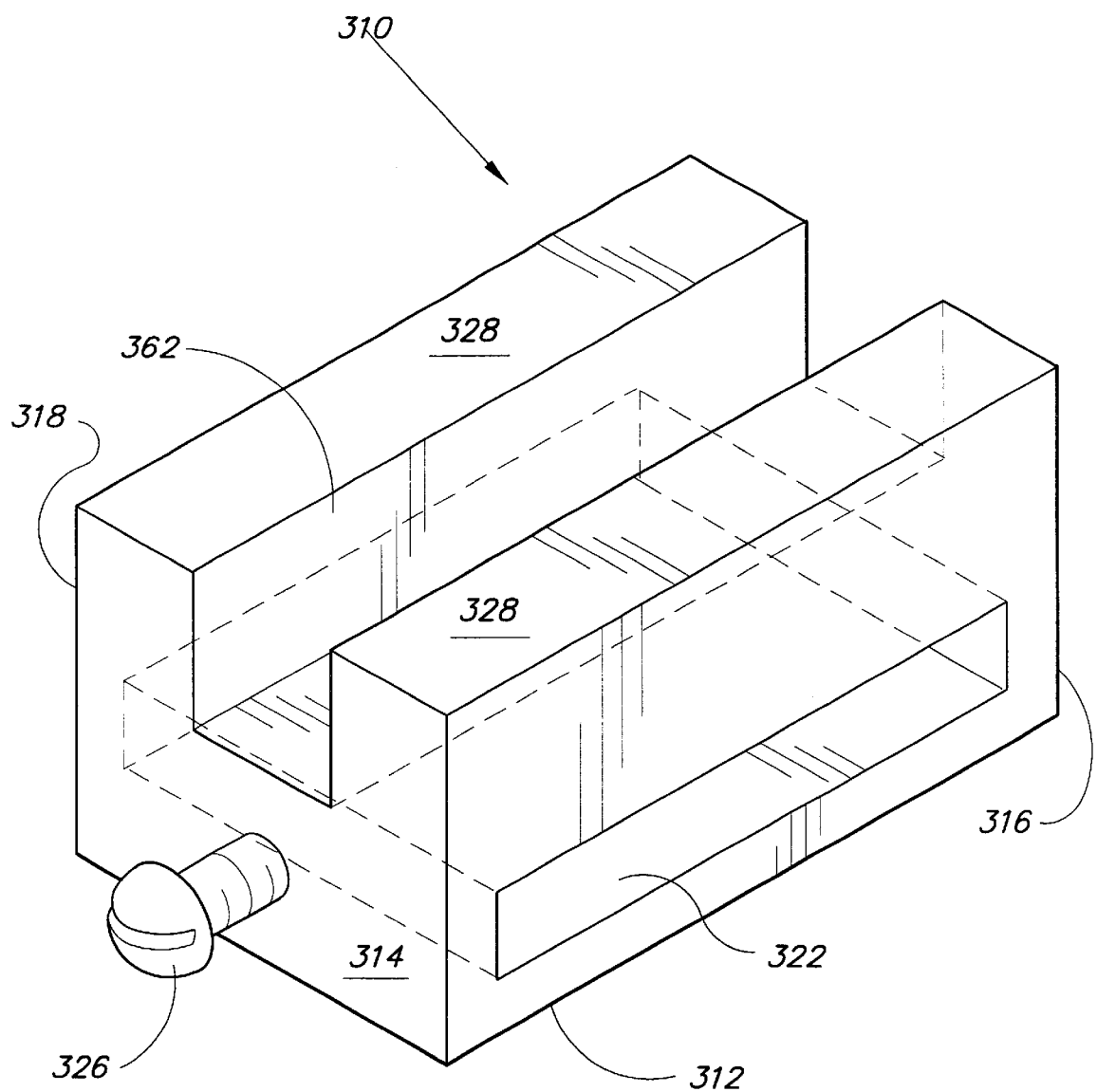
FIG. 7 is a perspective view of an attachment block configured as shown in FIG. 5.

Referring to FIGS. 6 and 7 there are shown perspective views of attachment blocks 310 in the conformation of FIG. 4 and of FIG. 5, respectively. In FIG. 4 conformation, the "T"-shaped block spirit level groove in block inner wall 328 is more clearly shown. Also shown is block spirit level groove spring 330 which bows outward from the bottom of groove 324 to maintain pressure against the spirit level peripheral edge(not shown). In FIG. 5 conformation, the spirit level slot 362 is more clearly shown.

Operation of the embodiments of FIG. 4 and of FIG. 5 is similar to the operation of the embodiments of FIG. 2 and FIG. 3, respectively as described above.

It is to be understood that the present invention is not limited to the sole embodiments described above, but encompasses any and all embodiments within the scope of the following claims.

I claim:

1. A level holder for vertically, horizontally, and diagonally aligning a post or pipe and adapted for retaining two straight conventional spirit levels, said holder comprising:

a pair of brackets, each of said brackets being bent at a right angle to form a bend vertex with two bracket legs, each of said legs having an elongated slot defined therein;

a structural support rod having opposite ends, each of the ends being permanently attached at the vertex bend of each of said brackets so as to vertically align said brackets;

means disposed through each said slot for adjustably holding each of the two spirit levels in a selected vertically aligned position; and adjustable means secured to said structural support rod for removably attaching said holder to the post or pipe.

2. The apparatus of claim 1, wherein said holding means comprises a "U"-bolt secured by a set of wing nuts.

3. The apparatus according to claim 1, wherein said holding means comprise a "C" spring clip having opposed, outward facing "C" portions connected by a base portion attached to a bolt and secured by a wing nut.

4. The apparatus according to claim 1, wherein said holding means comprises an inverted "C" spring clip having opposed, inward facing "C" portions, each of the "C" portions having outwardly extending release fingers, said "C" portions connected by a base portion attached to a bolt and secured by a wing nut.

5. The apparatus according to claim 1, wherein said adjustable means includes a strap with adjusting buckle, said strap being secured midway of said support rod.

6. The apparatus according to claim 1, wherein said brackets are made of a material selected from the group consisting of a thermoplastic and a metallic material.

7. A level holder for vertically, horizontally, and diagonally aligning a post or pipe and adapted for retaining two straight conventional spirit levels, said holder comprising:

a pair of brackets, each of said brackets being bent at a right angle to form a bend vertex with two bracket legs;

a structural support rod having opposite ends, each of the ends being permanently attached at the vertex bend of each of said brackets so as to vertically align said brackets;

a plurality of attachment blocks, each of said blocks having an upper end wall, a lower end wall, an outer wall, an inner wall, and two side walls and defining an elongated slot extending through said block from one of the side walls to another of the side walls, said slot being so configured as to slidably fit over each of the bracket legs of each said pair of brackets;

means disposed through the inner wall of each said attachment block for adjustably holding each of the two spirit levels in a selected vertically aligned position; and adjustable means attached to said structural support rod for removably attaching said holder to the post or pipe.

8. The apparatus of claim 7, wherein said attachment block includes a stop screw extending from said upper end wall for adjustably fixing said block along each of said bracket legs at a selected position.

9. The apparatus of claim 7, wherein said holding means includes a groove extending between the upper end wall and the lower end wall and so configured as to slidably fit over a peripheral lengthwise wall of each of the spirit levels.

10. The apparatus of claim 9, wherein said groove is "T"-shaped and includes an arcuate spring to maintain pressure against the lengthwise wall of each of the spirit levels.

* * * * *